United States Patent [19]

Netto

[11] 4,208,089
[45] Jun. 17, 1980

[54] INTRAVITAL MICROSCOPE AND BARREL ASSEMBLY AND OPTICAL SYSTEM THEREFOR

[75] Inventor: Daniel J. Netto, Los Angeles County, Calif.

[73] Assignee: University of Southern California, Los Angeles, Calif.

[21] Appl. No.: 967,587

[22] Filed: Dec. 8, 1978

[51] Int. Cl.$^2$ .......................... G02B 21/00; G02B 7/22
[52] U.S. Cl. .......................................... 350/46; 350/79
[58] Field of Search .................. 350/78, 79, 84, 82, 350/69, 45, 46, 54, 19, 87–91

[56] References Cited

U.S. PATENT DOCUMENTS

| | | | |
|---|---|---|---|
| 2,705,490 | 4/1955 | Littmann | 350/54 |
| 3,464,137 | 9/1969 | England | 350/82 |

FOREIGN PATENT DOCUMENTS

| | | | |
|---|---|---|---|
| 1208591 | 1/1966 | Fed. Rep. of Germany | 350/84 |
| 17511 | of 1896 | United Kingdom | 350/79 |

*Primary Examiner*—Jon W. Henry
*Attorney, Agent, or Firm*—Harris, Kern, Wallen & Tinsley

[57] ABSTRACT

An intravital microscope and, more particularly, a barrel assembly therefor comprising: a supporting structure; telescopically interconnected upper, intermediate and lower tubes carried by the supporting structure and defining an optical axis, the upper tube being axially movably mounted on the supporting structure, the intermediate tube being axially movable relative to the upper tube, and the lower tube being axially movable relative to the intermediate tube; interengageable stops on the lower and intermediate tubes for limiting downward movement of the lower tube relative to the intermediate tube; a first lock for locking the lower tube relative to the intermediate tube; a second lock for locking the intermediate tube relative to the upper tube; and a rack and pinion system for raising and lowering the upper tube. The barrel assembly includes a counterbalancing system for the tubes. An optical system carried by the lower tube and the supporting structure transmits an image from an objective carried by the lower tube, above a field in an object plane, to a beam receiver carried by the supporting structure laterally of the axis of the barrel assembly, which beam receiver may be a television camera, a recording camera, or an eyepiece. The field of view may be illuminated in various ways.

14 Claims, 15 Drawing Figures

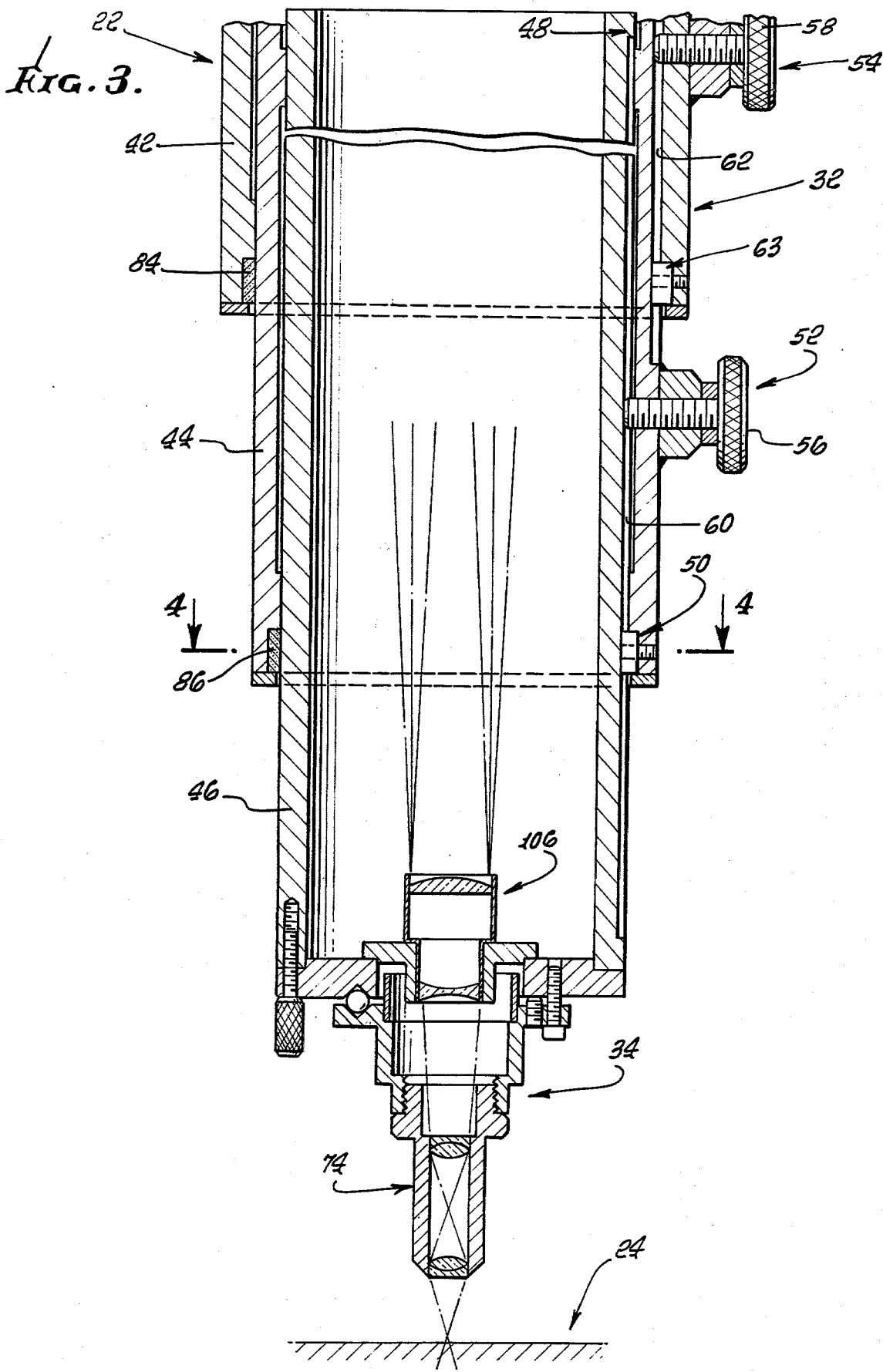

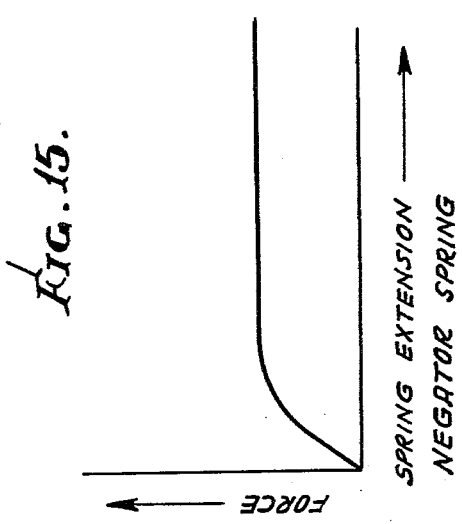
FIG. 15.
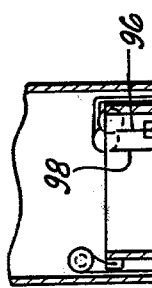
FIG. 9.
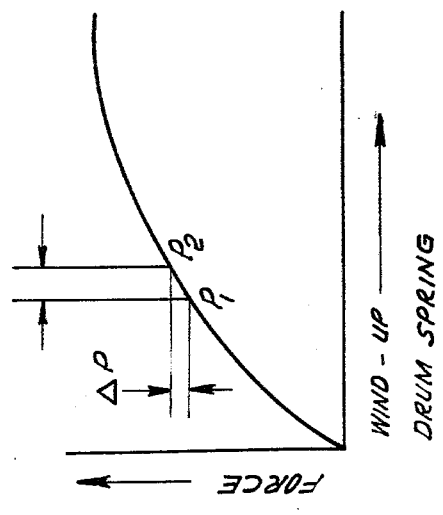
FIG. 14.
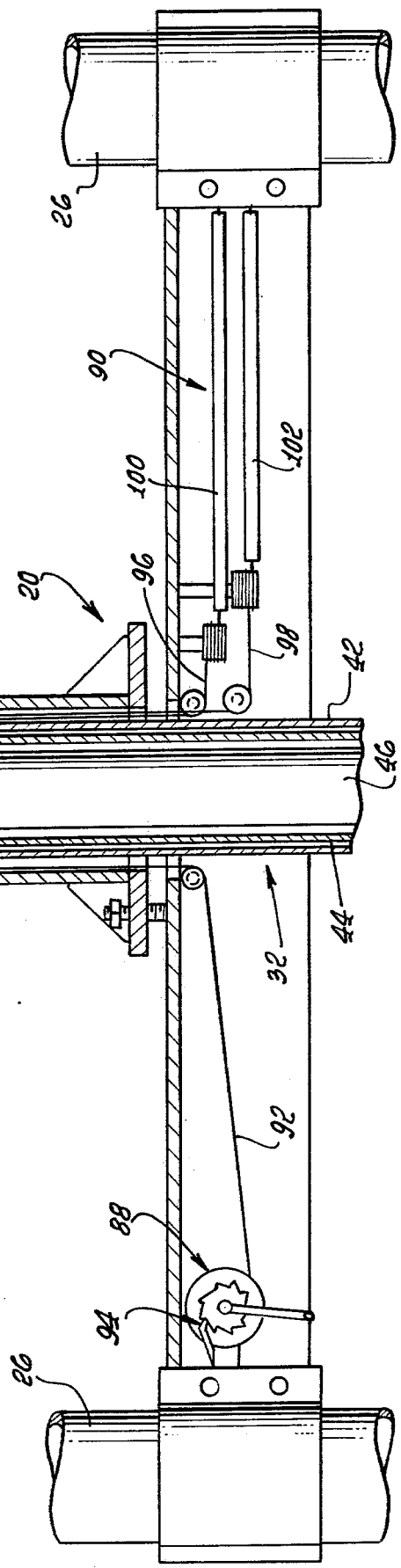

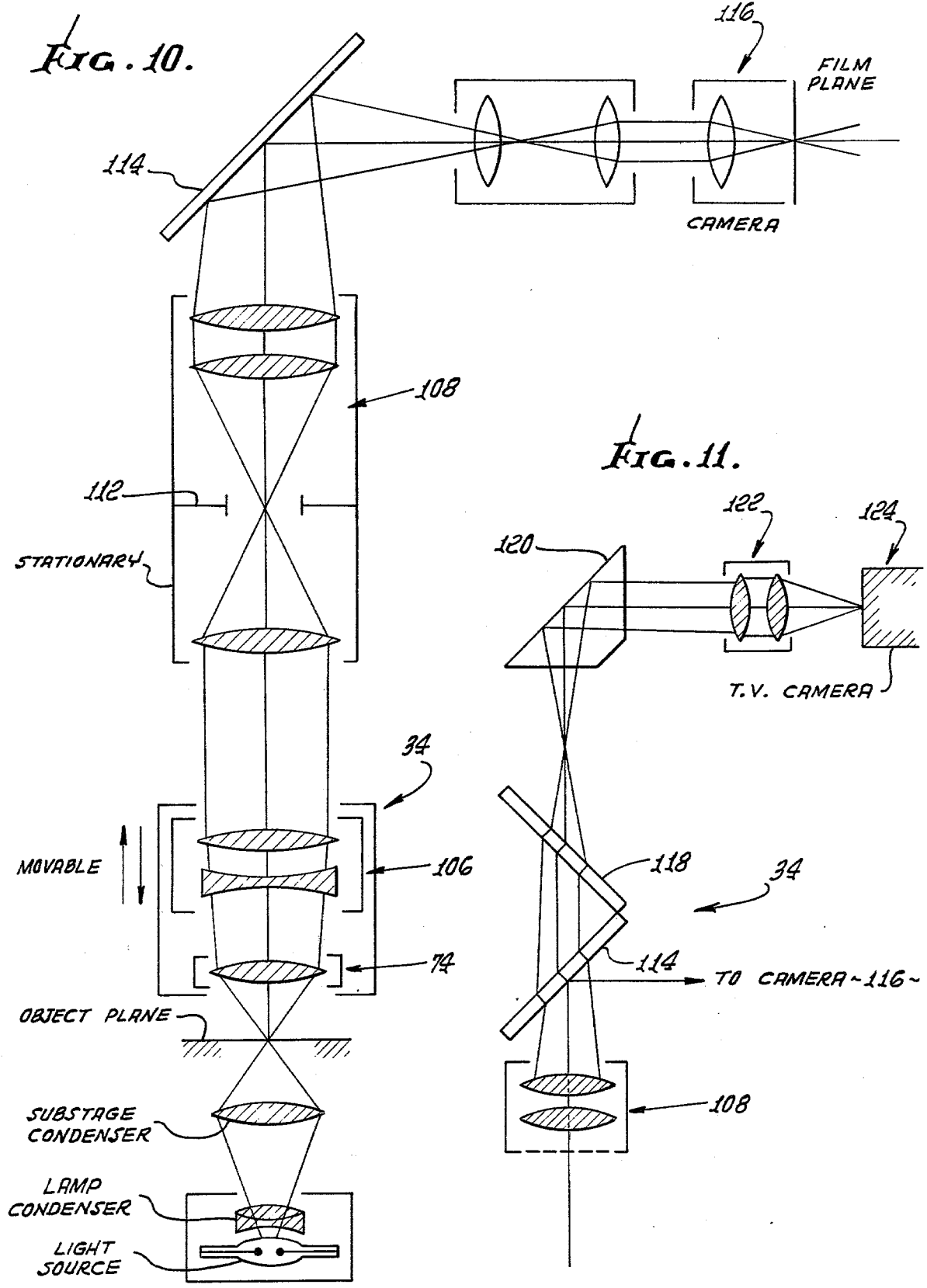

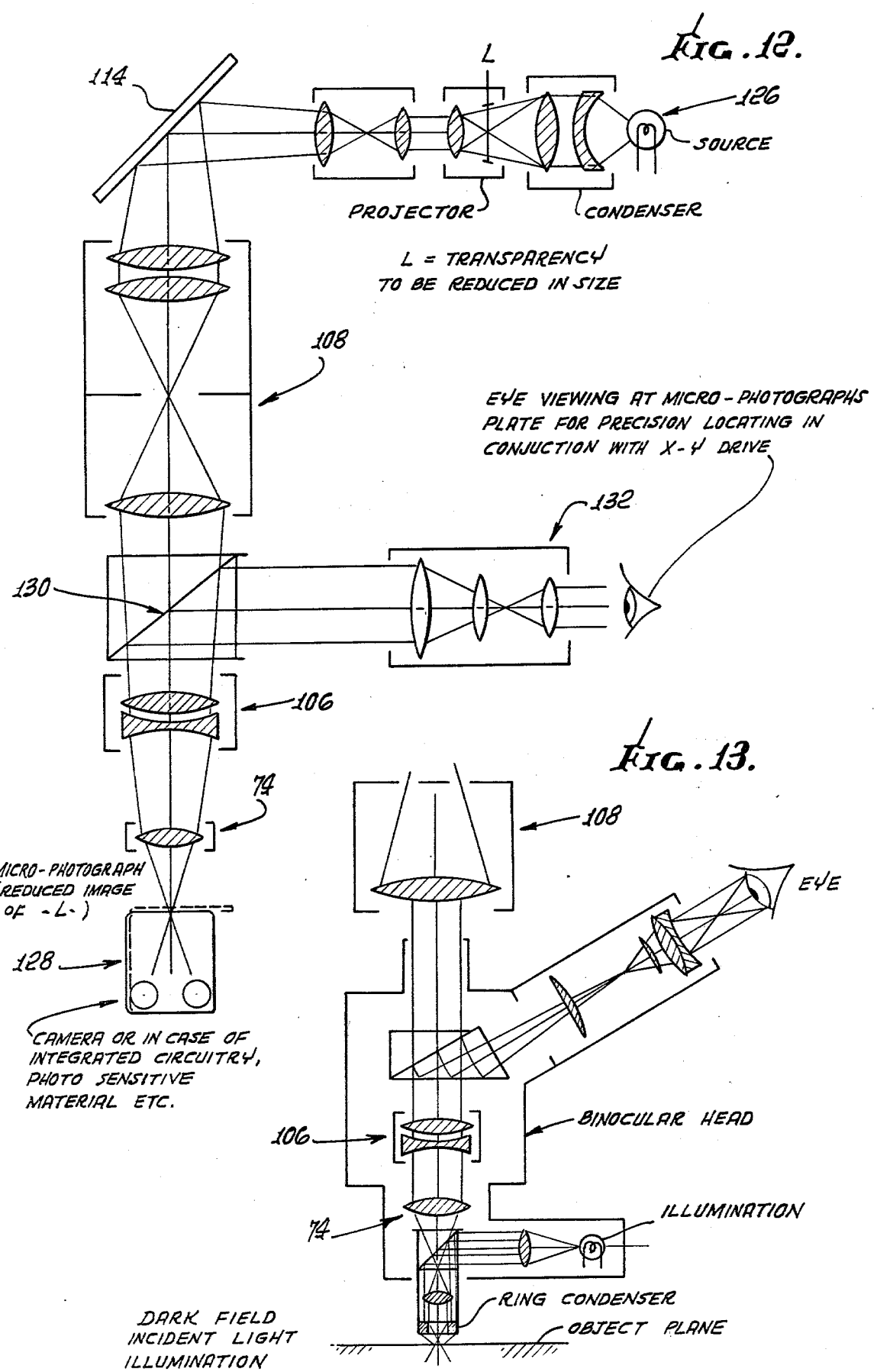

INTRAVITAL MICROSCOPE AND BARREL ASSEMBLY AND OPTICAL SYSTEM THEREFOR

BACKGROUND OF THE INVENTION

The present invention relates in general to microscopes and, more particularly, to an intravital microscope especially used for observing microcirculation in living animals, although the invention may be employed for other purposes as well.

The microscope or microscope assembly of the invention is preferably utilized in conjunction with the x-y table supporting and drive systems disclosed in my U.S. Pat. No. 4,026,536, issued May 31, 1977, although the microscope assembly of the invention may be employed in other environments.

Still more specifically, the present invention relates to a microscope barrel assembly, and to an optical system therefor.

OJBECTS AND SUMMARY OF INVENTION

A primary object of the invention is to provide a unique microscope barrel assembly which accurately defines the optical axis of the microscope.

More particularly, an important object of the invention is to provide, and the invention may be summarized as comprising, a microscope barrel assembly which includes: a supporting structure; telescopically interconnected upper, intermediate and lower tubes carried by the supporting structure and defining an optical axis, the upper tube being axially movably mounted on the supporting structure, the intermediate tube being axially movable relative to the upper tube, and the lower tube being axially movable relative to the intermediate tube; interengageable stop means on the lower and intermediate tubes for limiting downward movement of the lower tube relative to the intermediate tube; first lock means for locking the lower tube relative to the intermediate tube; second lock means for locking the intermediate tube relative to the upper tube; and drive means for axially moving the upper tube for focusing purposes.

With the foregoing construction, repeatability of the position of an objective carried by the lower tube relative to the specimen being studied is assured by pulling the lower tube down to the mechanical stop means, locking the lower tube relative to the intermediate tube, pulling the intermediate tube down to accommodate the specimen size, then locking the intermediate tube relative to the upper tube and focusing the microscope by axially moving the upper tube. By telescoping the lower tube upwardly, access to the specimen is provided, and by pulling the lower tube down to the mechanical stop means, the optical system is again in focus, at least approximately, because variations may be introduced by an altered position of the specimen after manipulation.

Other important objects of the invention are to provide adjustable needle bearing means for guiding the upper tube for axial movement relative to the supporting structure, and to provide a focusing drive means for the upper tube which includes a rack carried by the upper tube and paralleling the optical axis, and pinion means carried by the supporting structure for driving the rack, with wave spring means for relatively preloading the rack and the pinion means to eliminate backlash. The lower and intermediate tubes respectively slide axially in the intermediate and upper tubes with very small radial clearances provided by accurately ground interengageable surfaces. With the foregoing construction, extremely accurate definition of the optical axis is provided, which is an important feature.

Yet another important object is to provide means for counterbalancing the tubes of the barrel assembly, comprising drum spring means for counterbalancing the upper tube, and negator spring means for counterbalancing the intermediate and lower tubes. Preferably, the counterbalancing drum spring means is adjustable to accommodate variations in the weights of accessories added to the tubes.

The invention may be further summarized as comprising, and another important object is to provide, an optical system which includes: an objective carried by the lower tube, above a field in an object plane, and coaxial with the optical axis; a field corrector carried by the lower tube above the objective, and coaxial with the optical axis, for producing a collimated beam; a stationary image transfer lens assembly carried by the supporting structure above the field corrector and coaxial with the optical axis; a stationary beam splitter carried by the supporting structure above the image transfer lens assembly for diverting the beam laterally and transmitting the beam upwardly to a television camera for constant monitoring of the object under observation; and beam receiving means carried by the supporting structure for receiving the laterally diverted beam.

Various means of illuminating the field may be provided. More particularly, objects are to provide bright field transmitted light illumination of the field, incident light illumination of the field, and dark field illumination thereof.

Also, various viewing means for receiving the laterally diverted beam may be utilized. Related objects are to provide a beam receiving means comprising a television camera, or a recording camera. A further object in this connection is to include means providing visual viewing of an image defined by the beam. Still another object is to include means providing reverse projection image formation for microphotography purposes. Alternatively, the instrument of the invention may be utilized in photomicrography.

In addition to the foregoing, various other illuminating means, image viewing and/or recording means, and the like, may be provided.

The foregoing objects, advantages, features and results of the present invention, together with various other objects, advantages, features and results thereof which will be evident to those skilled in the microscope art in the light of this disclosure, may be achieved with the exemplary embodiments of the invention illustrated in the accompanying drawings and described in detail hereinafter.

DESCRIPTION OF DRAWINGS

FIG. 3 is a further enlarged sectional view duplicating the lower portion of FIG. 2;

FIG. 9 is a vertical sectional view on a reduced scale taken as indicated by the arrowed line 9—9 of FIG. 6, and showing drum spring and negator spring counterbalancing means of the invention;

FIGS. 14 and 15 are diagrammatic views showing the performances of the drum spring and negator spring means; and FIGS. 10, 11, 12 and 13 are diagrammatic optical system views showing various optical system embodiments, FIG. 10 showing bright field transmitted light illumination with a recording camera, FIG. 11 showing the optical system with a television camera, FIG. 12 showing a microphotography embodiment with visual viewing means, and FIG. 13 showing dark field incident light illumination with visual viewing means.

EXEMPLARY EMBODIMENT OF THE INVENTION, FIGS. 1-9, 14 AND 15

Figure 1:
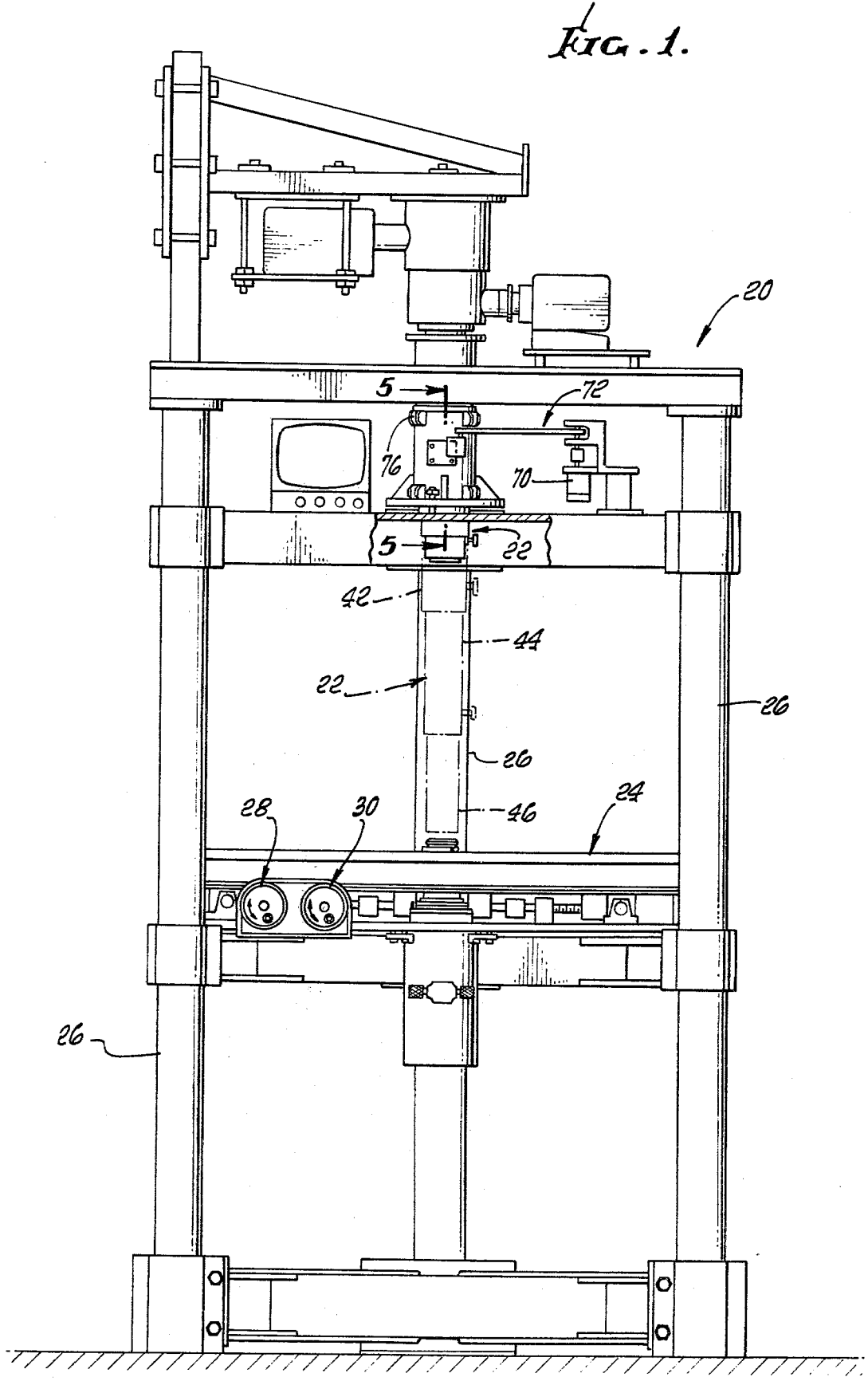
FIG. 1 is an elevational view of a microscope which embodies the invention, and which illustrates very generally the x-y table supporting and drive systems of my aforementioned patent.

Referring initially to FIG. 1 of the drawings, designated generally therein by the numeral 20 is a supporting structure for a vertically oriented microscope or microscope assembly 22 located above an x - y table 24 which is vertically movably mounted on uprights 26 of the supporting structure 20 for vertical adjustment relative to the microscope 22. The x - y table 24 is driven in the x and y directions by x and y drive means 28 and 30, respectively.

The supporting structure 20, the microscope 22 and the x - y table 24 carried thereby, and the x and y drive means 28 and 30, are all generally shown in my aforementioned U.S. Pat. No. 4,026,536. The present invention resides specifically in the microscope or microscope assembly 22 and, more particularly, in its barrel assembly 32 and optical system 34, better shown in FIGS. 2 to 9 of the drawings.

Considering the barrel assembly 32 in a general way, it includes telescopically interconnected upper, intermediate and lower barrels or tubes 42, 44 and 46 carried by the supporting structure 20 and defining the optical axis of the optical system 34 in a manner to be described in more detail hereinafter. As will also be described in more detail hereinafter, the upper tube 42 is axially movably mounted on the supporting structure 20, the intermediate tube 44 is axially movably mounted in the upper tube, and the lower tube 46 is axially movably mounted in the inermediate tube.

Interengageable stop means 48 and 50 on the lower and intermediate tubes 46 and 44, respectively, limit downward movement of the lower tube relative to the intermediate tube, these stop means being best shown in FIG. 3. The stop means 50 on the intermediate tube 44 extends into a longitudinal groove 60 in the lower tube 46 and serves to key the lower tube against rotation relative to the intermediate tube. The stop means 48 is carried by the lower tube 46 at the upper end of the groove 60 and is engageable with the stop means 50 to limit downward movement of the lower tube relative to the intermediate tube.

As best shown in FIG. 3, a first lock means 52 is provided for locking the lower tube 46 relative to the intermediate tube 44. A second lock means 54 is provided for locking the intermediate tube 44 relative to the upper tube 42. These lock means 52 and 54 are best shown in FIG. 3, and comprise radial locking screws 56 and 58, respectively, having knurled heads. The locking screws 56 and 58 are respectively carried by the intermediate and upper tubes 44 and 42, and extend into the longitudinal groove 60 and longitudinal groove 62 in the lower and intermediated tubes 46 and 44, respectively. A key means 63 on the upper tube 42 extends into the longitudinal groove 62 to prevent rotation of the intermediate tube 44 relative to the upper tube.

Figure 6:
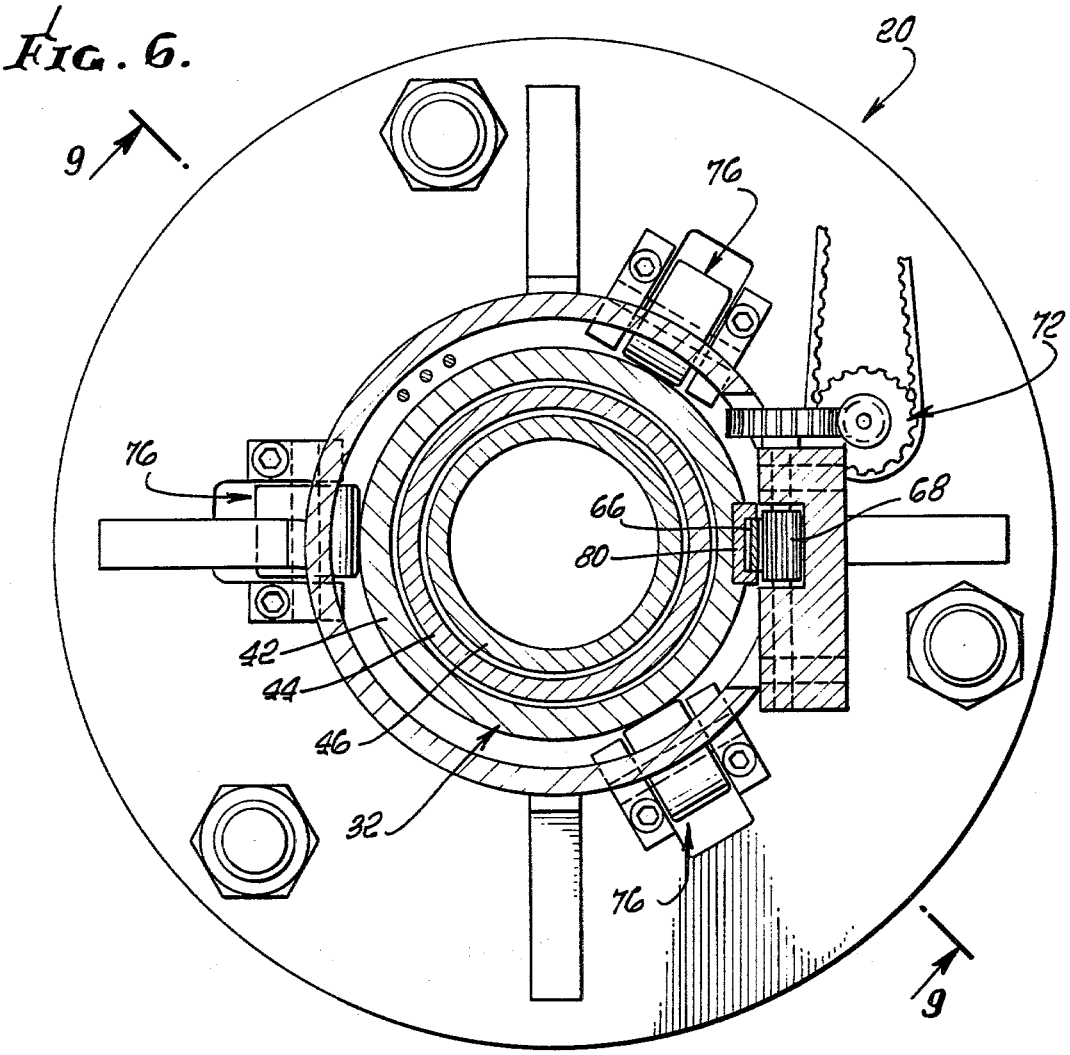
FIGS. 6 and 7 are transverse sectional views respectively taken as indicated by the arrowed lines 6—6 and 7—7 of FIG. 5.
Figure 7:
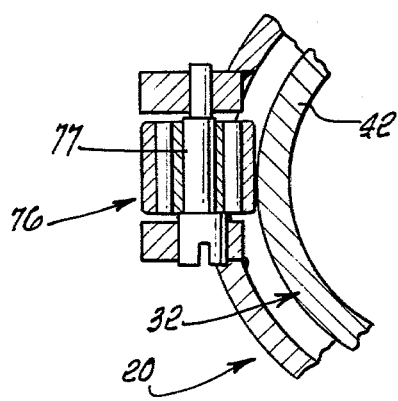
Figure 4:
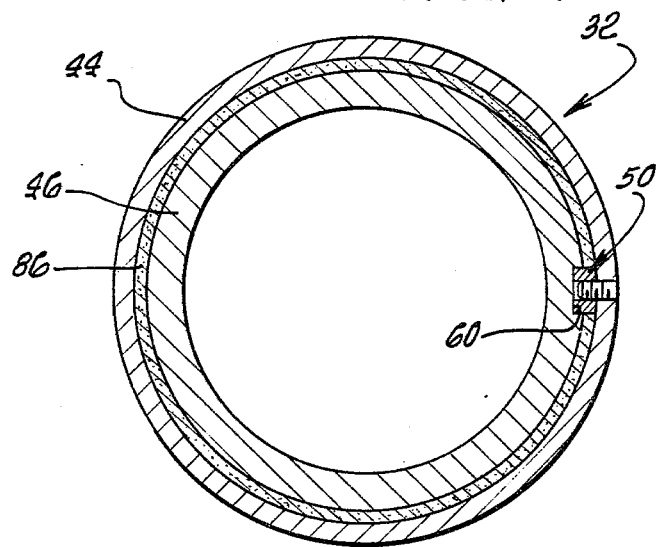
FIG. 4 is a transverse sectional view taken as indicated by the arrowed line 4—4 of FIG. 3.
Figure 5:
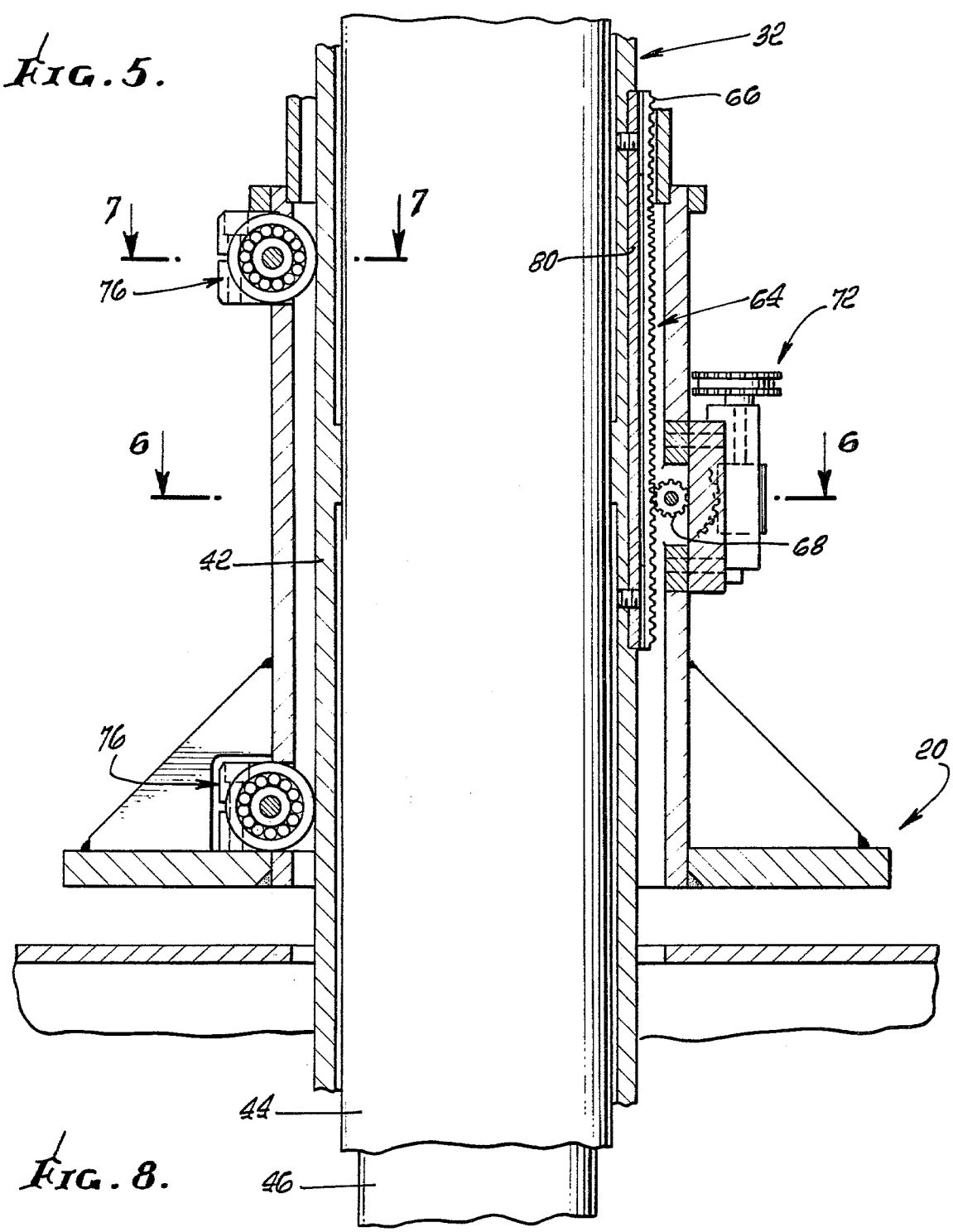
FIG. 5 is an enlarged vertical sectional view taken as indicated by the arrowed line 5—5 of FIG. 1.

As best shown in FIGS. 5, 6 and 7, a rack and pinion system or means 64 is provided for raising and lowering the upper tube 42 for the purpose of focusing the optical system 34. The rack and pinion means 64 comprises a rack 66 on the exterior of and parallel to the axis of the upper tube 42, and a pinion 68 carried by the supporting structure 20 and driven by a motor 70, FIG. 1, through a suitable drive train 72, FIGS. 1, 5 and 6.

With the foregoing construction, repeatability of the position of an objective 74 carried by the lower tube 46, relative to a specimen being studied on the x - y table 24, which x - y table provides an object plane, is assured by pulling the lower tube 46 down until the stop means 48 engages the stop means 50, locking the lower tube relative to the intermediate tube 44 with the lock means 52, pulling the intermediate tube down to accommodate the specimen size, then locking the intermediate tube relative to the upper tube with the lock means 54 and focusing the microscope 22 by axially moving the upper tube 42 with the rack and pinion means 64. By telescoping the lower tube 46 upwardly, access to the specimen is provided, and by pulling the lower tube down again until the upper stop means 48 engages the lower stop means 50, the optical system 34 is again in focus, at least approximately, because variations may be introduced by an altered position of the specimen after manipulation.

Considering some additional features of the barrel assembly 32, adjustable needle bearing means 76, FIGS. 5, 6 and 7, are provided for guiding the upper tube 42 for axial movement relative to the supporting structure 20, these adjustable needle bearing means being carried by the supporting structure 20 and engaging the exterior surface of the upper tube 42. It will be noted that there are six of the adjustable needle bearing means 76 arranged in three pairs circumferentially spaced 120° apart, the needle bearing means of each pair being vertically spaced apart. Each needle bearing means 76 includes, and is radially adjustable by means of, an eccentric 77, FIG. 7.

Figure 8:
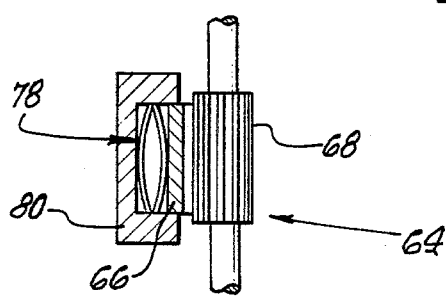
FIG. 8 is a fragmentary transverse sectional view illustrating wave spring means for rack and pinion preloading.

As best shown in FIG. 8, a wave spring means 78 is disposed between the rack 66 and its support 80 on the upper tube 42, and acts to bias the rack against the pinion 68, thereby preloading the rack and pinion means 64 to eliminate backlash.

Still another feature of the barrel assembly 32 is that the lower and intermediate tubes 46 and 44 respectively slide axially in the intermediate and upper tubes 44 and 42 with very small radial clearances provided by accurately ground interengageable surfaces. The outer surfaces of the tubes 44 and 46 are lubricated by felt pads 84 and 86, FIG. 3, respectively carried by the tubes 42 and 44. These felt pads, in addition to lubricating, also prevent entry of dust between the tubes 42 and 44 and between the tubes 44 and 46.

With the foregoing construction for the barrel assembly 32, extremely accurate definition of the optical axis of the optical system 34 is provided, which is an important feature of the invention.

Another important aspect of the barrel assembly 32 is that means are provided for counterbalancing the tubes 42, 44 and 46, comprising drum spring means 88 for counterbalancing the upper tube 42 and negator spring means 90 for counterbalancing the intermediate and lower tubes 44 and 46. Preferably, the counterbalancing spring means 88 is adjustable to accommodate variations in the weights of accessories added to the respective tubes 42, 44 and 46. The spring means 88 and 90 are shown in FIG. 9 of the drawings and will now be described.

The drum spring means 88 is mounted on the supporting structure 20 and is connected to the upper end of the upper tube 42 by a cable 92. The drum spring means 88 is preferably of the clock main-spring type and can be wound, by means of a ratchet and pawl arrangement 94, to provide the desired degree of counterbalancing of the upper tube 42. FIG. 14 shows that the counterbalancing force provided by the drum spring means 88 is not linear with respect to the spring wind-up. As the drum unwinds, the counterbalancing force decreases slightly. FIG. 14 shows ΔP for the drum circumference on which the counterbalancing cable 92 is wound. The drum diameter is large enough so that the total counterbalancing range is only one third of the circumference of the drum. With this arrangement, ΔP has no effect on the system. This arrangement has the advantage that when accessories are added to the upper tube 42, increasing its weight, the counterbalancing force is increased correspondingly by winding up the spring of the drum spring means 88.

Considering the negator spring means 90, the intermediate and lower tubes 44 and 46 are respectively connected by cables 96 and 98 to negator springs 100 and 102. As shown in FIG. 15, the counterbalancing force provided by each negator spring is constant regardless of the spring extension, throughout virtually the entire extension range.

OPTICAL SYSTEM 34, FIGS. 2 AND 3

Figure 2:
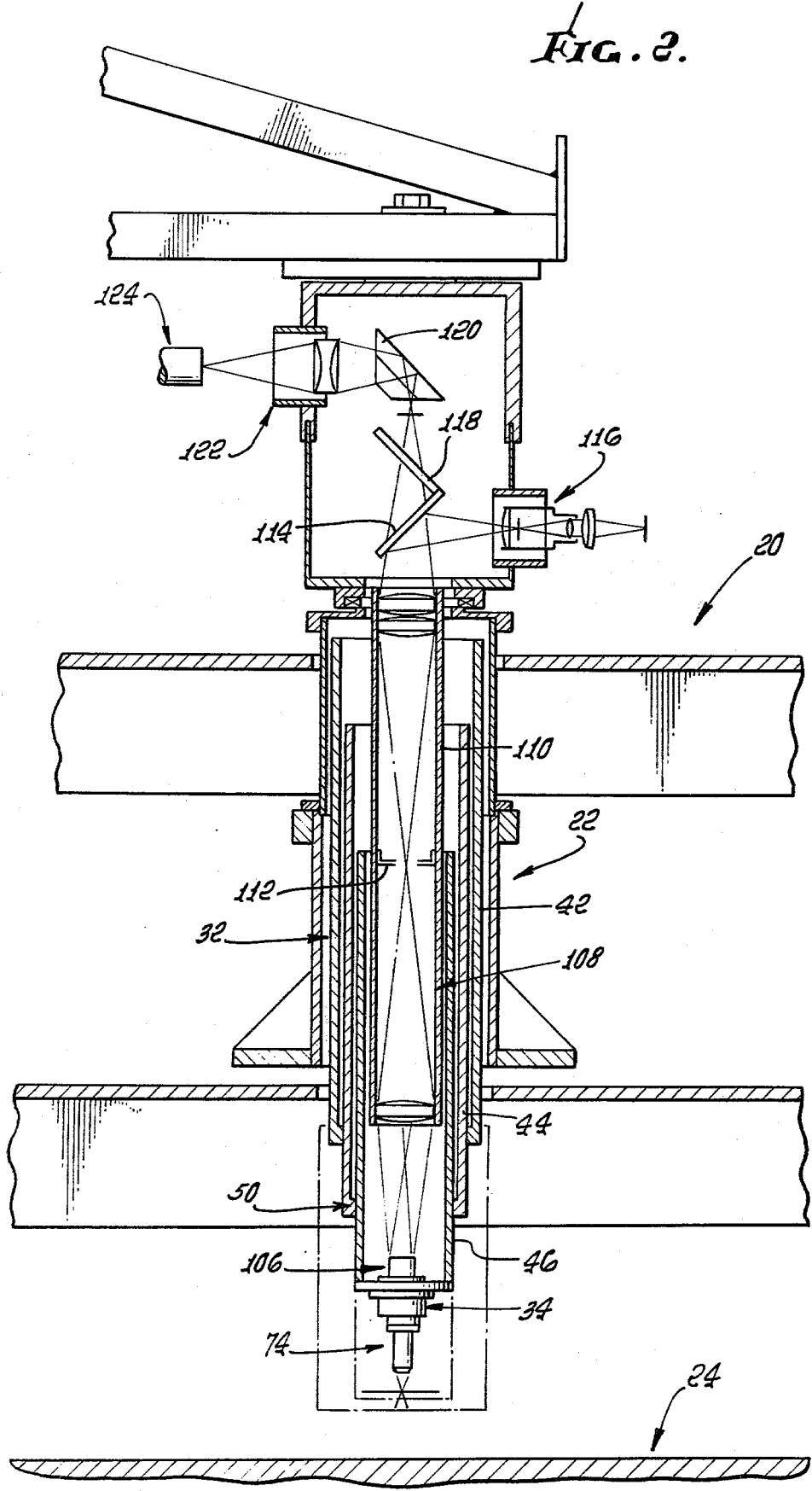
FIG. 2 is an enlarged vertical sectional view illustrating the microscope barrel assembly and optical system of the invention.

The optical system 34 includes the objective 74, which, as shown in FIGS. 2 and 3 of the drawings, is carried by the lower tube 46. The objective 74 picks up the image located in the object plane and transmits it through a field corrector 106, FIG. 3, carried by the lower tube 46 above the objective, and coaxial with the objective, the field corrector producing a collimated beam. A stationary image transfer lens assembly 108, FIG. 2, is disposed within and carried by a tube 110 forming part of the supporting structure 20, the image transfer lens assembly being located above and coaxial with the field corrector 106. The image transfer lens assembly 108 also includes an optical field diaphragm 112 intermediate the lenses of this assembly.

A stationary beam splitter 114 carried by the supporting structure 20 above the image transfer lens assembly 108 diverts the beam laterally to a suitable beam receiving means 116, which may be a recording camera. The beam splitter 114 has a transmission of 21% and the 20% transmitted beam continues through an optical axis corrector 118 to a prism 120 which inverts the image and diverts it through a projection lens 122 to a television camera 124. The latter is used for monitoring, e.g., mapping the specimen. The recording camera 116 and the television camera 124 are so selected that when the image is in focus on the television screen, it will also be in focus on the film utilized in the recording camera 116.

OPTICAL SYSTEM 34, FIGS. 10 AND 11

FIGS. 10 and 11 show the hereinbefore discussed elements of the optical system 34 in diagrammatic form, the same reference numerals being applied. At the lower end of FIG. 10 are shown labeled components which provide bright field transmitted light illumination of a field in the object plane, it being thought unecessary to apply identifying reference numerals to such components.

OPTICAL SYSTEM, FIG. 12

This figure shows a reversed projection system for use in microphotography. In this case, a light source 126 replaces the camera 116 and the beam receiving means may be a recording camera 128 for use in microphotography. A beam splitter 130 diverts the image laterally to an eyepiece 132, as indicated by the associated legend in FIG. 12, the beam splitter 130 being located between the field corrector 106 and the image transfer lens assembly 108.

OPTICAL SYSTEM, FIG. 13

This figure shows how the optical system 34 of the invention may be adapted to dark field incident light illumination, the legends in FIG. 13 being self-explanatory.

Although exemplary embodiments of the invention have been disclosed for illustrative purposes, it will be understood that various changes, modifications and substitutions may be incorporated in such embodiments without departing from the invention as defined by the claims hereinafter appearing.

I claim as my invention:

1. In a microscope assembly, the combination of:
   (a) a supporting structure
   (b) telescopically interconnected upper, intermediate and lower tubes carried by said supporting structure and defining an optical axis, said upper tube being axially movable mounted on said supporting structure, said intermediate tube being axially movably relative to said upper tube, and said lower tube being axially movable relative to said intermediate tube;
   (c) interengageable stop means on said lower and intermediate tubes for limiting downward movement of said lower tube relative to said intermediate tube;
   (d) first lock means for locking said lower tube relative to said intermediate tube;
   (e) second lock means for locking said intermediate tube relative to said upper tube;
   (f) adjustable needle bearing means for guiding said upper tube for axial movement relative to said supporting structure.
   (g) an objective carried by said lower tube above a field in an object plane, and coaxial with said optical axis;
   (h) a field corrector carried by said lower tube above said objective, and coaxial with said optical axis, for producing a collimated beam;
   (i) a stationary image transfer lens assembly carried by said supporting structure above said field corrector and coaxial with said optical axis;
   (j) a stationary beam splitter carried by said supporting structure above said image transfer lens assembly for diverting part of the beam laterally and transmitting part of the beam upwardly; and (k) beam receiving means carried by said supporting structure for receiving the laterally diverted and upwardly transmitted beam.

2. A microscope assembly as defined in claim 1 including means providing bright field transmitted light illumination of said field.

3. A microscope assembly according to claim 1 including means providing incident light illumination of said field.

4. A microscope assembly as set forth in claim 1 including means providing dark field illumination of said field.

5. A microscope assembly as defined in claim 1 wherein said beam receiving means comprises a television camera.

6. A microscope assembly according to claim 1 wherein said beam receiving means comprises a recording camera.

7. A microscope assembly as set forth in claim 1 including means providing visual viewing of an image defined by said beam.

8. A microscope assembly as defined in claim 1 including means providing a light source directed to said beam splitter for projection image formation.

9. In a microscope barrel assembly, the combination of:

(a) a supporting structure;
(b) telescopically interconnected upper, intermediate and lower tubes carried by said supporting structure and defining an optical axis, said upper tube being axially movably mounted on said supporting structure, said intermediate tube being axially movable relative to said upper tube, and said lower tube being axially movable relative to said intermediate tube;
(c) interengageable stop means on said lower and intermediate tubes for limiting downward movement of said lower tube relative to said intermediate tube;
(d) first lock means for locking said lower tube relative to said intermediate tube;
(e) second lock means for locking said intermediate tube relative to said upper tube; and
(f) adjustable needle bearing means for guiding said upper tube for axial movement relative to said supporting structure 10. A microscope barrel assembly according to claim 9 including a rack carried by said upper tube and paralleling said optical axis, and pinion means for driving said rack.

11. A microscope barrel assembly according to claim 10 including wave spring means for relatively preloading said rack and said pinion means.

12. A microscope barrel assembly according to claim 9 including means for counterbalancing said tubes.

13. A microscope barrel assembly as set forth in claim 12 including drum spring means for counter-balancing said upper tube.

14. A microscope barrel assembly according to claim 13 including negator spring means for counter-balancing said intermediate and lower tubes.

* * * * *

UNITED STATES PATENT AND TRADEMARK OFFICE
CERTIFICATE OF CORRECTION

PATENT NO. : 4,208,089
DATED : June 17, 1980
INVENTOR(S) : Daniel J. NETTO

It is certified that error appears in the above-identified patent and that said Letters Patent are hereby corrected as shown below:

Column 5, line 62, Delete "21%"  Insert - -20% - -

Signed and Sealed this

Thirtieth Day of December 1980

[SEAL]

Attest:

SIDNEY A. DIAMOND

Attesting Officer

Commissioner of Patents and Trademarks